United States Patent
Acharya

(10) Patent No.: US 6,985,441 B1
(45) Date of Patent: Jan. 10, 2006

(54) INTELLIGENT EMBEDDED PROCESSOR ENABLED MECHANISM TO IMPLEMENT RSVP FUNCTION

(75) Inventor: Yatin R. Acharya, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 801 days.

(21) Appl. No.: 09/797,691

(22) Filed: Mar. 5, 2001

(51) Int. Cl.
*H04L 12/26* (2006.01)

(52) U.S. Cl. .................. 370/231; 370/235; 370/389; 709/240

(58) Field of Classification Search ............ 370/443, 370/389, 395.2, 412, 229–231, 235.1, 351, 370/355, 360, 410, 428, 392, 400; 709/223–229, 709/240
See application file for complete search history.

(56) References Cited

U.S. PATENT DOCUMENTS

| | | | |
|---|---|---|---|
| 5,903,735 A * | 5/1999 | Kidder et al. ............... 709/240 |
| 6,046,979 A * | 4/2000 | Bauman ..................... 370/229 |
| 6,092,113 A * | 7/2000 | Maeshima et al. .......... 709/230 |
| 6,314,098 B1 * | 11/2001 | Masuda et al. ............. 370/392 |
| 6,353,616 B1 * | 3/2002 | Elwalid et al. ............. 370/443 |
| 6,493,317 B1 * | 12/2002 | Ma ........................... 370/237 |
| 6,594,268 B1 * | 7/2003 | Aukia et al. ................ 370/400 |
| 6,728,365 B1 * | 4/2004 | Li et al. .................... 379/329 |
| 6,754,223 B1 * | 6/2004 | Lussier et al. ............. 370/412 |
| 6,765,927 B1 * | 7/2004 | Martin et al. ............... 370/469 |
| 2003/0137960 A1 * | 7/2003 | Greis ........................ 370/338 |
| 2003/0189900 A1 * | 10/2003 | Barany et al. .............. 370/229 |
| 2004/0019876 A1 * | 1/2004 | Dravida et al. ............. 717/117 |

FOREIGN PATENT DOCUMENTS

WO   WO 9950999 A1 * 10/1999

* cited by examiner

*Primary Examiner*—Steven Nguyen
*Assistant Examiner*—Clemence Han
(74) *Attorney, Agent, or Firm*—Harrity & Snyder LLP

(57) ABSTRACT

A network device includes a filter and an embedded processor. The filter receives a packet, determines whether the packet is an RSVP packet, and transmits an interrupt signal when the packet is an RSVP packet. The embedded processor receives the interrupt signal and generates at least one packet processing parameter in response to the interrupt signal.

18 Claims, 4 Drawing Sheets

INTELLIGENT EMBEDDED PROCESSOR ENABLED MECHANISM TO IMPLEMENT RSVP FUNCTION

TECHNICAL FIELD

The present invention relates generally to communication systems and, more particularly, to a system and method for implementing a Resource Reservation Protocol (RSVP) function in a network device via hardware.

BACKGROUND ART

In computer networks, a number of network stations are typically interconnected via a communications medium. For example, Ethernet 802.3 is a commonly used local area network (LAN) scheme in which multiple stations are connected to a shared or dedicated serial data path. These stations often communicate with a switch or some other network device located between the data path and the stations connected to that path. The switch typically controls the communication of packets and includes logic for receiving and forwarding packets to their appropriate destinations.

Currently, when a switch receives an RSVP packet, the switch sends the RSVP packet to a host device for processing. Such a procedure can result in delays in packet processing during those times when resources are unavailable at the host device for processing the packet.

DISCLOSURE OF THE INVENTION

There exists a need for a mechanism that generates packet processing parameters on-chip to thereby increase system throughput. This and other needs are met by the present invention, where local hardware, under software control when needed, automatically generates a group of packet processing parameters upon detection of an RSVP packet.

Additional advantages and other features of the invention will be set forth in part in the description that follows and in part will become apparent to those having ordinary skill in the art upon examination of the following or may be learned from the practice of the invention. The advantages and features of the invention may be realized and obtained as particularly pointed out in the appended claims.

According to the present invention, the foregoing and other advantages are achieved in part by a network device that includes a filter and an embedded processor. The filter receives a packet, determines whether the packet is an RSVP packet, and transmits an interrupt signal when the packet is an RSVP packet. The embedded processor receives the interrupt signal and generates at least one packet processing parameter in response to the interrupt signal.

Other advantages and features of the present invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BRIEF DESCRIPTION OF THE DRAWINGS

Reference is made to the attached drawings, where elements having the same reference number designation represent like elements throughout.

BEST MODE FOR CARRYING OUT THE INVENTION

The present invention will be described with the example of a switch in a packet switched network, such as an Ethernet (IEEE 802.3) network. It will become apparent, however, that the present invention is also applicable to other packet switched systems, as described in detail below, as well as to other types of systems in general.

Switch Architecture Overview

Figure 1:
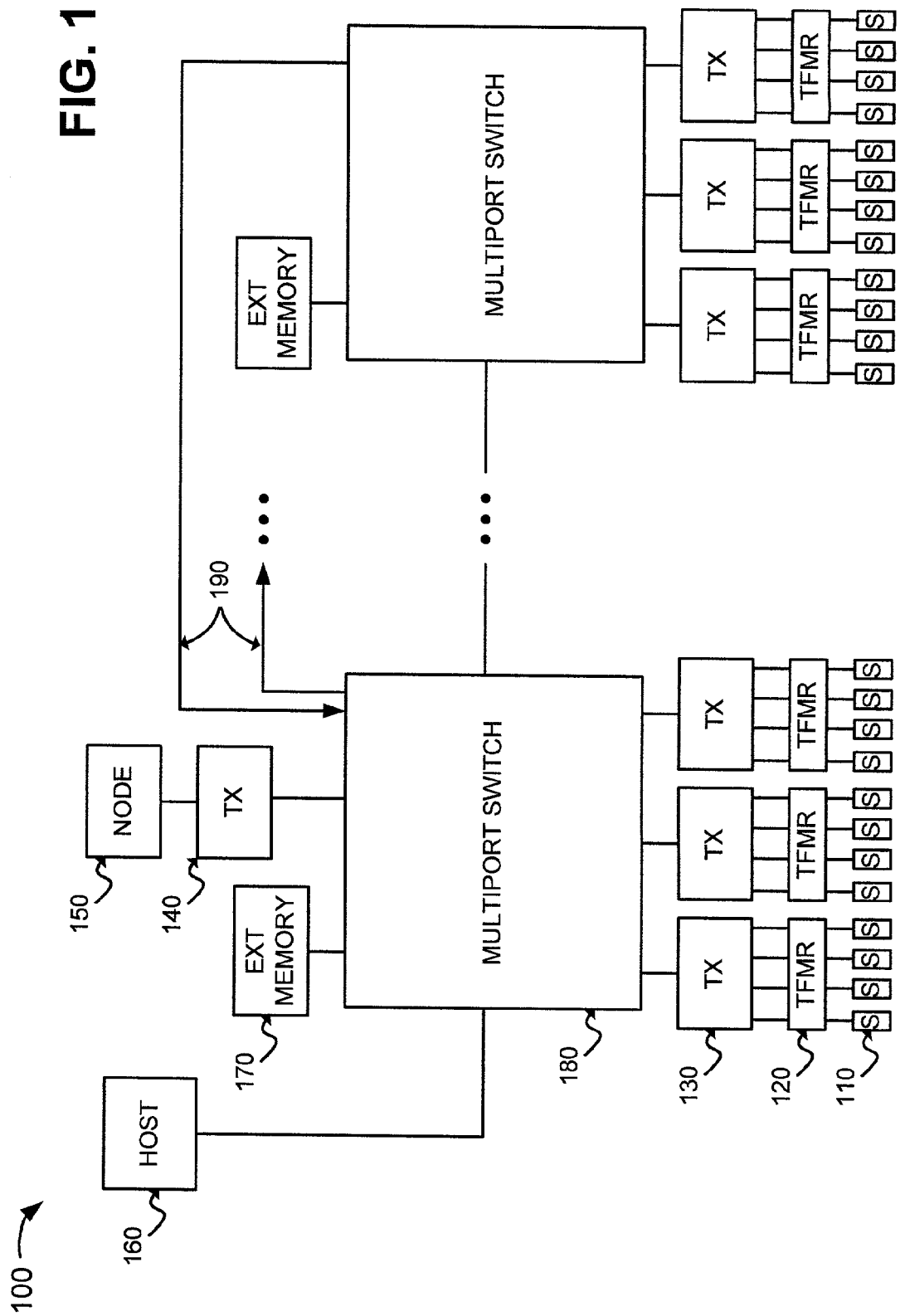
FIG. 1 is a block diagram of an exemplary system in which a system and method consistent with the present invention may be implemented.

FIG. 1 is a block diagram of an exemplary system in which systems and methods consistent with the present invention may be implemented. The exemplary system may include a packet switched network 100, such as an Ethernet (IEEE 802.3) network. The packet switched network 100 may include network stations 110, transformers 120, transceivers 130 and 140, a network node 150, a host 160, external memories 170, and multiport switches 180. The network stations 110 may include conventional communication devices, such as computers, with different configurations. For example, the devices may send and receive data at network data rates of 10 megabits per second (Mb/s) or 100 Mb/s.

Each 10/100 Mb/s network station 110 may send and receive data to and from a multiport switch 180 according to either a half-duplex or full duplex Ethernet protocol. The Ethernet protocol ISO/IEC 8802-3 (ANSI/IEEE Std. 802.3, 1993 Ed.) defines a half-duplex media access mechanism that permits all stations 110 to access the network channel with equality. Traffic in a half-duplex environment may not be distinguished over the transmission medium. Rather, each half-duplex station 110 may include an Ethernet interface card that uses carrier-sense multiple access with collision detection (CSMA/CD) to listen for traffic on the transmission medium. The absence of network traffic is detected by sensing deassertion of a receive carrier on the transmission medium.

Any station 110 having data to send may attempt to access the channel by waiting a predetermined amount of time, known as the interpacket gap interval (IPG), after deassertion of the receive carrier on the transmission medium. If multiple stations 110 are connected to the same link, each of the stations 110 may attempt to transmit data in response to the sensed deassertion of the receive carrier and after the IPG interval, possibly resulting in a collision. Hence, the transmitting station 110 may monitor the transmission medium to determine if there has been a collision due to another station 110 sending data on the same link at the same time. If a collision is detected, both stations 110 cease transmitting, wait a random amount of time, and then retry the transmission.

The 10/100 Mb/s network stations 110 that operate in full duplex mode may send and receive data packets according to the Ethernet standard IEEE 802.3u. The full duplex environment provides a two-way, point-to-point communication link enabling simultaneous transmission and reception of data packets between each link partner (i.e., the 10/100 Mb/s network station 110 and the corresponding multiport switch 180).

The transformers 120 may include magnetic transformers that provide AC coupling between the network stations 110 and the transceivers 130. The transceivers 130 may include 10/100 Mb/s physical layer transceivers that communicate with the multiport switches 180 via respective serial media independent interfaces (SMIIs) or reduced media independent interfaces (RMIIs). Each of the transceivers 130 may be configured to send and receive data packets between the multiport switch 180 and up to four network stations 110 via the SMII/RMII. The SMII/RMII may operate at a data rate sufficient to enable simultaneous transmission and reception of data packets by each of the network stations 110 and the corresponding transceiver 130.

The transceiver 140 may include one or more 1000 Mb/s (i.e., 1 Gb/s) physical layer transceivers that provide communication with nodes, such as the network node 150, via, for example, a high speed network transmission medium. The network node 150 may include one or more 1 Gb/s network nodes that send and receive data packets at a network speed of 1 Gb/s. The network node 150 may include, for example, a server or a gateway to a high-speed backbone network.

The host 160 may include a computer device that provides external management functions to control the overall operation of the multiport switches 180. The external memories 170 may include synchronous static random access memories (SSRAMs) that provide external storage for the multiport switches 180. Each of the external memories 170 may include a Joint Electron Device Engineering Council (JEDEC) pipelined burst or Zero Bus Turnaround (ZBT) SSRAM having a 64-bit wide data path and a 17-bit wide address path. The external memories 170 may be addressable as upper and lower banks of 128K in 64-bit words. The size of the external memories 170 is preferably at least 1 Mbyte with data transfers possible on every clock cycle through pipelining.

The multiport switches 180 selectively forward data packets received from the network stations 110 or the network node 150 to the appropriate destination according to the appropriate transmission protocol, such as the Ethernet protocol. The multiport switches 180 may be cascaded together (via lines 190) to expand the capabilities of the multiport switches 180.

Figure 2:
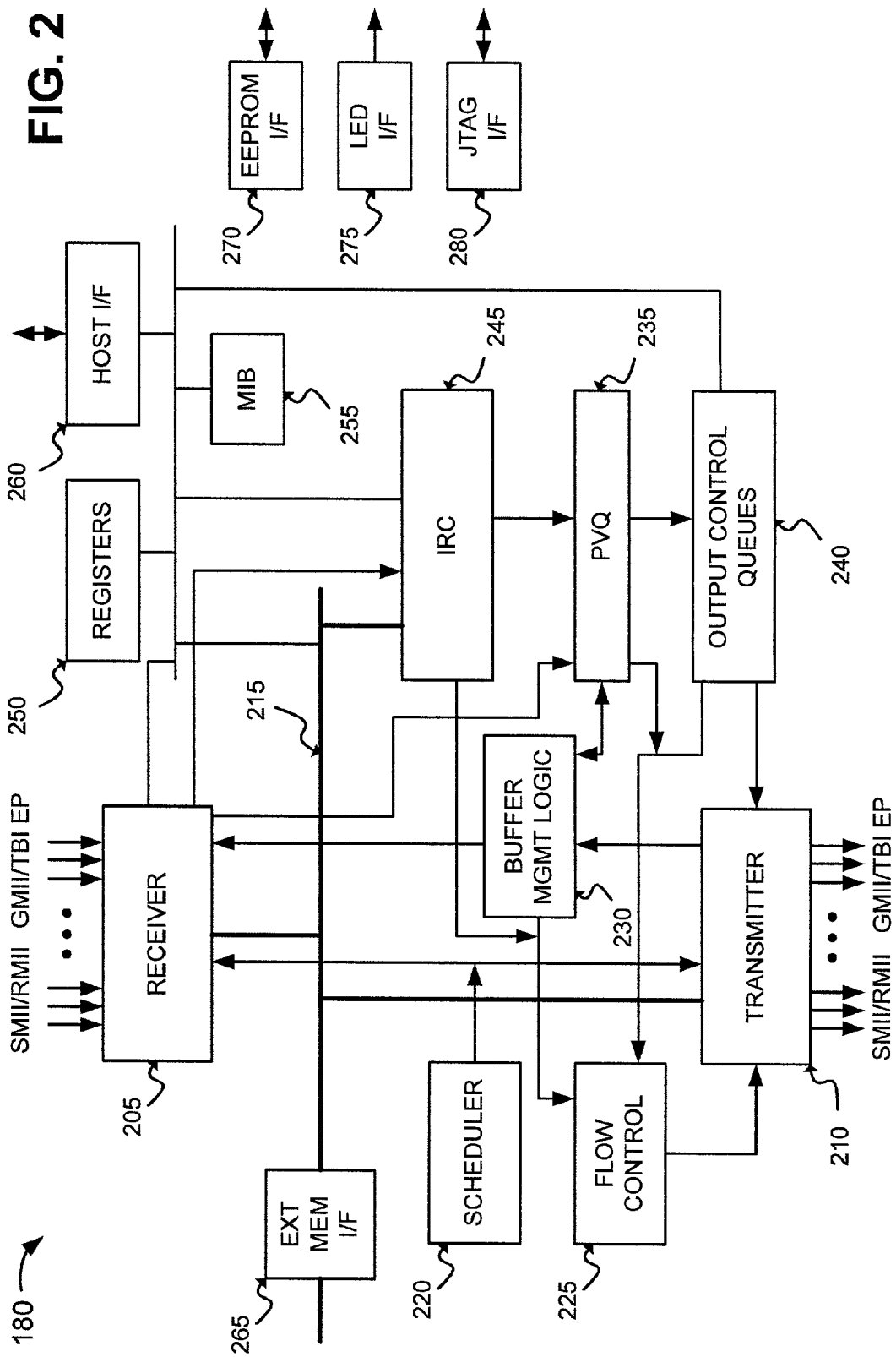
FIG. 2 is a detailed diagram of the multiport switch of FIG. 1 according to an implementation consistent with the present invention.

FIG. 2 is a detailed diagram of the multiport switch 180 according to an implementation consistent with the present invention. The multiport switch 180 may include a receiver 205, a transmitter 210, a data bus 215, a scheduler 220, flow control logic 225, buffer management logic 230, a port vector queue (PVQ) 235, output control queues 240, an internal rules checker (IRC) 245, registers 250, management information base (MIB) counters 255, a host interface 260, an external memory interface 265, an EEPROM interface 270, an LED interface 275, and a Joint Test Action Group (JTAG) interface 280.

The receiver 205 may include media access control (MAC) modules and receive buffers, such as first-in, first-out (FIFO) buffers. The receive modules may include input ports that support SMIIs, RMIIs, gigabit media independent interfaces (GMIIs), ten bit interfaces (TBIs), and proprietary interfaces for expansion with other multiport switches 180 (FIG. 1). The expansion ports (EPs) may be used to transfer data between other multiport switches 180 according to a prescribed protocol. The expansion ports may permit the multiport switches 180 to be cascaded together to form a backbone network. Each of the receive modules may include queuing logic that receives data packets from the network stations 110 and/or network node 150 and stores the packets in the corresponding receive FIFOs. The queuing logic may then send portions of the packets to the IRC 245 for processing and to the external memory 170 for storage via the external memory interface 265.

The transmitter 210 may include MAC modules and transmit buffers, such as FIFO buffers. The transmit modules may include output ports that support SMIIs, GMIIs, TBIs, and proprietary interfaces for expansion with other multiport switches 180. Each of the transmit modules may include dequeuing logic that obtains packets from the external memory 170 and stores the packets in the corresponding transmit FIFOs. The transmit modules may read the data packets from the corresponding transmit FIFOs and transmit the packets to the network stations 110 and/or network node 150. In an alternative implementation consistent with the present invention, the functions of the receiver 205 and transmitter 210 may be performed by a transceiver that manages both the receiving and transmitting of data packets.

The data bus 215 may include one or more conductors that connect the receiver 205, the transmitter 210, the IRC 245, and the external memory interface 265. The scheduler 220 may include logic that controls access to the external memory 170 by the queuing and dequeuing logic of the receiver 205 and transmitter 210, respectively. The multiport switch 180 is configured to operate as a non-blocking switch, where network data is received and transmitted from the switch ports at the respective wire rates of 10, 100, or 1000 Mb/s. Hence, the scheduler 220 may control the access by different ports to optimize use of the bandwidth of the external memory 170.

The flow control logic 225 may include logic that operates in conjunction with the buffer management logic 230, the PVQ 235, and the output control queues 240 to control the transmission of packets by the transmitter 210. The flow control logic 225 may control the transmitter 210 so that the transmitter 210 outputs packets in an efficient manner based on the volume of data traffic. The buffer management logic 230 may include logic that oversees the use of memory within the multiport switch 180. For example, the buffer management logic 230 may manage the use of frame pointers and the reuse of frame pointers once the data packet has been transmitted to its designated output port(s). Frame pointers identify the location of data frames stored in the external memory 170 that require transmission.

The PVQ 235 may include logic that obtains a frame pointer to the appropriate output queue(s) in output control queues 240 that correspond to the output ports to receive the data frame transmission. For multicopy frames, the PVQ 235 may supply multiple copies of the same frame pointer to more than one output queue. The output control queues 240 may include a FIFO-type output queue corresponding to each of the transmit modules in the transmitter 210. Each of the output queues may include multiple priority queues for frames having different levels of priority. For example, a high priority queue may be used for frames that require a lower access latency (e.g., frames for multimedia applications or management frames). The frame pointers stored in the FIFO-type output queues may be processed by the dequeuing logic for the respective transmit modules. The dequeuing logic uses the frame pointers to access the external memory 170 to read data frames at the memory locations specified by the frame pointers.

The IRC 245 may include an internal decision making engine that makes frame forwarding decisions for data packets that are received by the receiver 205. The IRC 245 may monitor (i.e., "snoop") the data bus 215 to determine the frame pointer value and a part of the data frame, for example, the header information of a received packet, including the source, destination, and virtual local area network (VLAN) address information. The IRC 245 may use the header information to determine which output port will output the data frame stored at the location specified by the frame pointer. The IRC 245 may, thus, determine that a given data frame should be output by either a single port (i.e., unicast), multiple ports (i.e., multicast), all ports (i.e., broadcast), or no port (i.e., discarded).

For example, each data frame may include a header that identifies the source and destination addresses. The IRC 245 may use the destination address to identify the appropriate output port to output the data frame. The frame header may also include VLAN address information that identifies the frame as information destined to one or more members of a group of network stations 110. The IRC 245 may alternatively determine that a data frame should be transferred to another multiport switch 180 via the expansion port.

Therefore, the IRC 245 determines whether a frame temporarily stored in the external memory 170 should be output to a single output port, multiple output ports, no output port, or another multiport switch 180. The IRC 245 may make its forwarding decision based on information stored in an IRC address table.

The IRC 245 may output its forwarding decision to the PVQ 235 in the form of a forwarding descriptor. The forwarding descriptor may include, for example, a priority class identifying whether the data frame is high priority or low priority, a port vector identifying each output port that should transmit the frame, the input port number, or VLAN information. The PVQ 235 may decode the forwarding descriptor to obtain the frame pointer. The PVQ 235 may then supply the frame pointer to the appropriate output queues within the output control queues 240.

The IRC 245 may also perform layer 3 filtering. For example, the IRC 245 may examine each received data packet for up to 128 programmable patterns and process the packet based on the result. The result may dictate that the IRC 245 drop the packet, forward the packet to the host 160, or assign a user priority or a Differentiated Services Code Point (DSCP) to the packet. User priorities and the DSCP may be independently mapped into output priority classes.

The registers 250 may include configuration and status registers used by the host interface 260. The MIB counters 255 may provide statistical network information in the form of MIB objects for use by the host 160. The host interface 260 may include a standard interface that permits an external management entity, such as the host 160, to control the overall operation of the multiport switch 180. The host interface 260 may decode host accesses within a prescribed register space and read and write configuration and status information to and from the registers 250. The registers 250, MIB counters 255, host interface 260, receiver 205, data bus 215, output control queues 240, and IRC 245 may be connected via a host bus 262.

The external memory interface 265 may include a standard interface that permits access to the external memory 170. The external memory interface 265 may permit external storage of packet data in the external memory 170 in a direct memory access (DMA) transaction during an assigned time slot determined by the scheduler 220. In an implementation consistent with the present invention, the external memory interface 265 operates at a clock frequency of at least 66 MHz and, preferably, at a frequency of 100 MHz or above.

The EEPROM interface 270 may include a standard interface to another external memory, such as an EEPROM. The LED interface 275 may include a standard interface to external LED logic. The LED interface 275 may send the status of conditions of the input and output ports to the external LED logic. The LED logic may drive LED display elements that are human-readable. The JTAG interface 280 may include a standard interface to external testing equipment to permit, for example, a boundary scan test to be performed on the multiport switch 180.

The foregoing description of the switch architecture provides an overview of the switch operations in a packet switched network. A more detailed description of the features of the present invention as embodied, for example, in the multiport switch 180 is provided below.

The present invention is directed to logic that detects an RSVP packet and automatically generates processing parameters in response thereto. By avoiding the need for a host to generate the processing parameters, the present invention increases the throughput of packets in the multiport switch 180.

Figure 3:
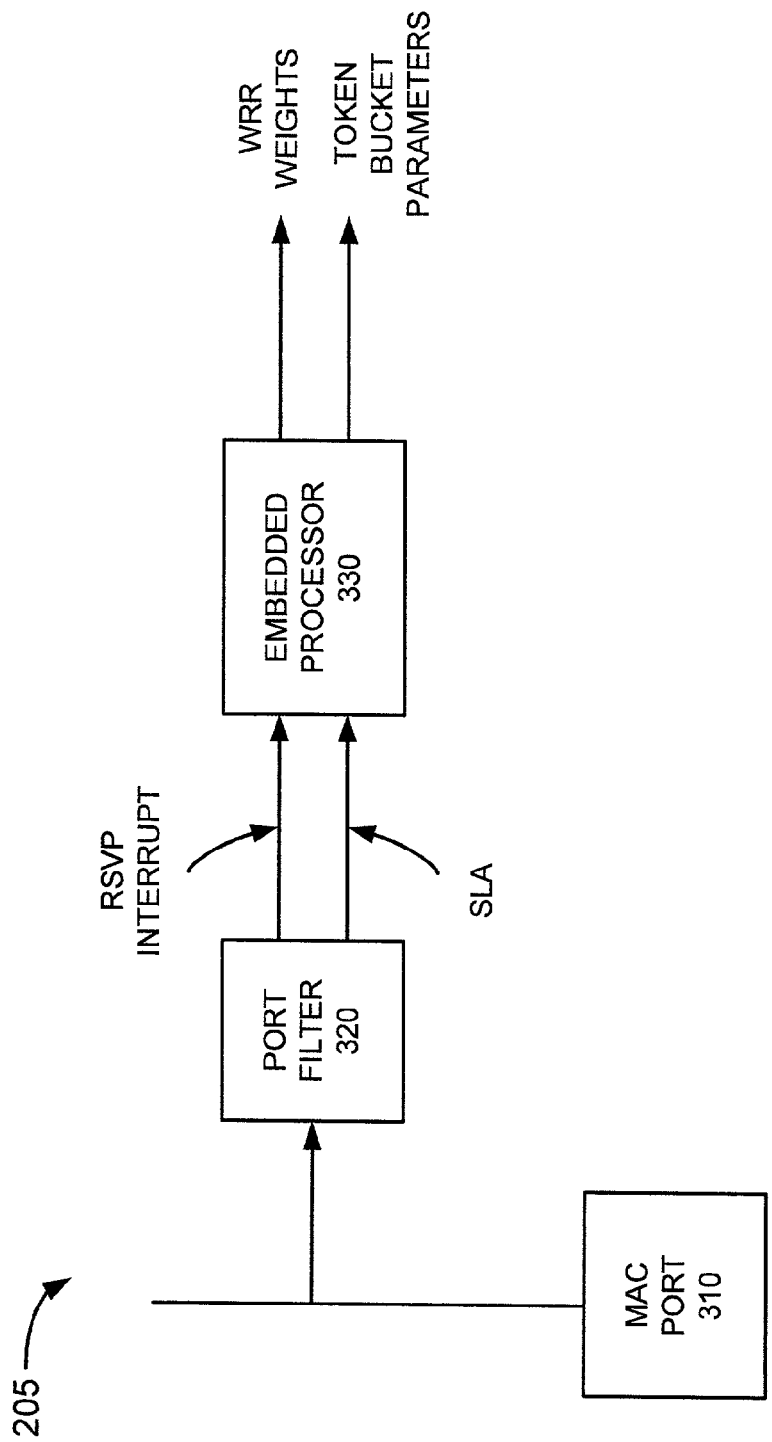
FIG. 3 is an exemplary diagram, consistent with the present invention, of the receiver of FIG. 2.

FIG. 3 is an exemplary diagram of the receiver 205 of FIG. 2. As illustrated, the receiver 205 includes a MAC input port FIFO buffer 310, a port filter 320, and an embedded processor 330. The number of elements shown in FIG. 3 is provided for simplicity. It will be appreciated that the receiver 205 may contain a separate FIFO buffer 310 and port filter 320 for each input port of the multiport switch 180.

The input port FIFO buffer 310 may include a FIFO memory device that temporarily buffers data frames received on the corresponding input port. The port filter 320 may include logic for analyzing a received data frame. In an implementation consistent with the present invention, the port filter 320 includes logic for detecting bandwidth reservation protocols, such as RSVP (resource reservation protocol), to ensure that the desired class of service is available to the packet stream. An RSVP packet typically includes one or more service level agreement (SLA) parameters in its payload that specify the level of service that is expected for that packet. Upon detecting an RSVP packet, the port filter 320 may transmit an interrupt signal to the embedded processor 330. The port filter 320 may also transmit the SLA parameters to the embedded processor 330.

The embedded processor 330 may include logic for generating data for processing received packets based on the SLA parameters included in the packet's payload. The embedded processor 330 may, for example, generate weights for a weighted round robin (WRR) mechanism (not shown) that dictates the order in which packets are transmitted by the switch 180 and token bucket parameters, such as rate and volume parameters, that dictate the volume and/or rate of packets transmitted from the switch 180.

In one implementation consistent with the present invention, the embedded processor 330 services all of the ports of the multiport switch 180. That is, the embedded processor 330 connects to the port filters 320 associated with each port of the switch 180 and generates packet processing parameters for packets received via these ports. In an alternative implementation consistent with the present invention, the multiport switch 180 may associate a separate embedded processor 330 with each input port.

Exemplary Processing

Figure 4:
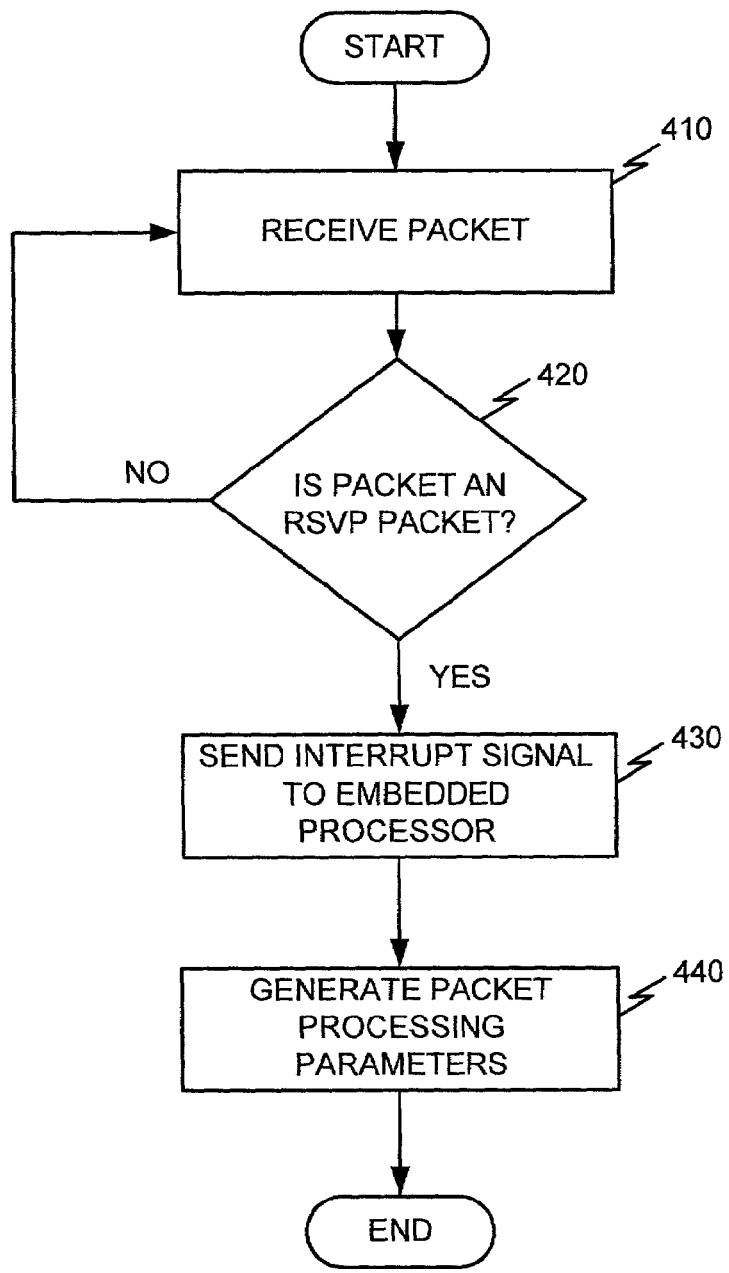
FIG. 4 is a flowchart of exemplary processing for generating packet processing parameters according to an implementation consistent with the present invention.

FIG. 4 is a flowchart of exemplary processing for generating packet processing parameters according to an implementation consistent with the present invention. Processing may begin with a network device, such as multiport switch 180, receiving a packet [act 410]. Assume, for example, that the packet is received via the MAC port 310. The MAC port 310 transfers the packet to the port filter 320 for analysis. If the port filter 320 determines that the received packet is an RSVP packet [act 420], the port filter 320 transmits an interrupt signal to the embedded processor 330 [act 430]. The port filter 320 may, for example, determine that a particular packet is an RSVP packet by analyzing the header of the received packet. The port filter 320 may also transfer the packet's SLA parameters to the embedded processor 330.

Using the SLA parameters, the embedded processor 330 may generate one or more packet processing parameters [act 440]. These parameters may include, for example, WRR weights and/or token bucket parameters that control the rate, volume, and/or order in which packets are transmitted from the multiport switch 180. The multiport switch 180 may then process and transmit the packet based on the generated parameters.

Described has been a system and method for increasing throughput in a network device. Advantages of the present invention include the ability to generate packet processing parameters on-chip to thereby avoid delays associated with an external host device generating these parameters.

Only the preferred embodiments of the invention and a few examples of its versatility are shown and described in the present disclosure. It is to be understood that the invention is capable of use in various other combinations and environments and is capable of modifications within the scope of the inventive concept as expressed herein. For example, while a series of acts has been described with respect to FIG. 4, the order of the acts may be varied in other implementations consistent with the present invention. No element or act used in the description of the present application should be construed as critical unless explicitly described as such.

The scope of the invention is defined by the claims and their equivalents.

What is claimed is:

1. A network device comprising:
 a filter configured to receive a packet, determine whether the packet is an RSVP packet that includes one or more service level agreement parameters, and transmit an interrupt signal and the one or more service level agreement parameters when the packet is an RSVP packet; and
 an embedded processor configured to receive the interrupt signal and the one or more service level agreement parameters and generate at least one packet processing parameter in response to the interrupt signal and the one or more service level agreement parameters.

2. The network device of claim 1 wherein the network device includes a plurality of input ports and
 wherein the filter includes a plurality of filters, each of the plurality of filters being associated with a different input port of the plurality of input ports.

3. The network device of claim 2 wherein the embedded processor includes a plurality of embedded processors, each embedded processor of the plurality of embedded processors is associated with a different input port of the plurality of input ports.

4. The network device of claim 1 wherein the at least one packet processing parameter includes a weight value for a weighted round robin mechanism.

5. The network device of claim 1 wherein the at least one packet processing parameter includes one or more token bucket parameters.

6. The network device of claim 5 wherein the one or more token bucket parameters include a rate parameter.

7. The network device of claim 5 wherein the one or more token bucket parameters include a volume parameter.

8. A method for generating packet processing parameters in a network device including a port filter and an embedded processor, comprising:
 receiving at least one packet including at least one service level agreement parameter;
 determining, via the port filter, whether the at least one packet includes an RSVP indication;
 transmitting an interrupt signal and the at least one service level agreement parameter to the embedded processor when the at least one packet includes an RSVP indication; and
 generating one or more packet processing parameters in response to receiving the interrupt signal and the at least one service level agreement parameter.

9. The method of claim 8 wherein the one or more packet processing parameters include one or more token bucket parameters.

10. The method of claim 9 wherein the one or more token bucket parameters include a rate parameter.

11. The method of claim 9 wherein the one or more token bucket parameters include a volume parameter.

12. The method of claim 8 wherein the one or more packet processing parameters include at least one weight value for a weighted round robin mechanism.

13. A network device comprising:
 a plurality of input ports configured to receive packets;
 a filter associated with each input port and configured to determine whether a received packet includes an RSVP indication and transmit an interrupt signal when the packet includes an RSVP indication; and
 an embedded processor configured to receive the interrupt signal and generate at least one packet processing parameter in response to receiving the interrupt signal.

14. The network device of claim 13 wherein the embedded processor includes a separate embedded processor connected to each filter.

15. The network device of claim 13 wherein the filter is further configured to:
 transmit one or more service level agreement parameters to the embedded processor when the received packet is determined to include an RSVP indication, and
 wherein, when generating at least one packet processing parameter, the embedded processor is configured to:
 generate the at least one packet processing parameter using the one or more service level agreement parameters.

16. The network device of claim 13 wherein the at least one packet processing parameter includes one or more weight values for a weighted round robin mechanism.

17. The network device of claim 13 wherein the at least one packet processing parameter includes at least one token bucket parameter.

18. The network device of claim 17 wherein the at least one token bucket parameter includes one or more of a rate parameter and a volume parameter.

* * * * *